United States Patent
He et al.

(10) Patent No.: US 8,983,469 B2
(45) Date of Patent: Mar. 17, 2015

(54) METHOD AND SYSTEM FOR MANAGING NEIGHBOR CELL INFORMATION

(75) Inventors: Meifang He, Shenzhen (CN); Zhongming Chen, Shenzhen (CN); Yin Gao, Shenzhen (CN)

(73) Assignee: ZTE Corporation, Hi-Tech Industrial Park, Nanshan District Shenzhen, Guangdong Province (CN)

( * ) Notice: Subject to any disclaimer, the term of this patent is extended or adjusted under 35 U.S.C. 154(b) by 0 days.

(21) Appl. No.: 13/521,388

(22) PCT Filed: May 18, 2011

(86) PCT No.: PCT/CN2011/074217
§ 371 (c)(1),
(2), (4) Date: Jul. 10, 2012

(87) PCT Pub. No.: WO2011/160512
PCT Pub. Date: Dec. 29, 2011

(65) Prior Publication Data
US 2013/0189986 A1    Jul. 25, 2013

(30) Foreign Application Priority Data

Jun. 25, 2010 (CN) .......................... 2010 1 0220514

(51) Int. Cl.
*H04W 36/00* (2009.01)

(52) U.S. Cl.
CPC ................................. *H04W 36/0083* (2013.01)
USPC .......................... 455/436; 455/432.1; 455/438

(58) Field of Classification Search
USPC ................... 455/436, 437, 446, 552.1, 426.1, 455/432.1–444; 370/331, 252, 328, 338
See application file for complete search history.

(56) References Cited

U.S. PATENT DOCUMENTS

| | | | |
|---|---|---|---|
| 2008/0014957 A1* | 1/2008 | Ore | 455/452.1 |
| 2008/0070506 A1* | 3/2008 | Ore | 455/63.2 |
| 2009/0137265 A1* | 5/2009 | Flore et al. | 455/525 |
| 2009/0270079 A1* | 10/2009 | Han et al. | 455/414.1 |

FOREIGN PATENT DOCUMENTS

| | | |
|---|---|---|
| CN | 101489210 A | 7/2009 |
| CN | 101656914 A | 2/2010 |
| CN | 101754302 A | 6/2010 |

OTHER PUBLICATIONS

Self-optimizing Neighbor Cell List for UTRA FDD Networks Using Detected Set Reporting by Soldani et al., dated Apr. 22-25, 2007.*

(Continued)

*Primary Examiner* — Daniel Lai
(74) *Attorney, Agent, or Firm* — Husch Blackwell LLP

(57) ABSTRACT

A method and system for managing neighbor cell information are disclosed in the present invention. A user equipment is reselected into a current Universal Terrestrial Radio Access (UTRA) cell from a former resident cell belonging to other system, and finds out that the former resident cell is not in a neighbor cell list of the current UTRA cell and the user equipment itself supports a neighbor cell relation maintenance function, and/or after receiving an indication notified by a network side that the user equipment can report neighbor cell relation, the user equipment reports an air interface signaling message carrying cell information of the former resident cell to a Radio Network Controller (RNC); the RNC receives and decodes the air interface signaling message, acquires the cell information of the former resident cell, and updates inter-system neighbor cell information according to the cell information of the former resident cell.

16 Claims, 5 Drawing Sheets

(56) References Cited

OTHER PUBLICATIONS

English Translation of the Written Opinion of the International Search Authority for CN20081218047 20081205.*

EPO Machine Translation for CN101754302 (A), dated Jun. 23, 2010.*
3GPP TS 36.300 V9.3.0, dated Mar. 2010, p. 144-150.*
International Search Report for PCT/CN2011/074217 dated Aug. 25, 2011.

* cited by examiner

METHOD AND SYSTEM FOR MANAGING NEIGHBOR CELL INFORMATION

TECHNICAL FIELD

The present invention relates to the field of wireless communications, and more especially, to a method and system for managing neighbor cell information.

BACKGROUND OF THE RELATED ART

Ensuring the service continuity of a mobile user is a fundamental function of the cellular mobile communication system, and the switching of serving cells of the mobile station is the main means to ensure the service continuity. In order to facilitate a User Equipment (UE for short) to switch, the system needs to configure a neighbor relation for each cell so that the network side notifies the UE of the neighbor cell information, after measuring the neighbor cells, the UE reports measurement results, and the network side indicates the UE to switch to a certain neighbor cell.

Which neighbor cells are around a certain cell is not only related to their distances to the cell, but also closely related to the wireless environment in which the cell is located. Due to the complexity of the wireless environment, especially in urban area where the high-rise buildings are dense, at the early stage of network planning, it is difficult to exactly determine which neighbor cells should be configured to a certain cell. Some other factors, such as one cell being newly added in the system, the cell's properties being changed, the neighbor relation of the cell being not updated timely, the environment being changed, or the neglect of the network planning personnel etc., will result in the neighbor cell information not being updated timely. Thus, it will result in the user equipment not being able to be witched to other cells timely, which results in occurrence of conditions such as very high load of the cell, worse signal quality of the cell, serious interference or dropped call of the user etc.

The cell information consists of cell physical layer information and cell high-layer information. The cell physical layer information is a cell's primary scrambling code (PSC for short), and during the network planning, the PSC in a certain cell is unique. The cell high-layer information comprises two parts: a Public Land Mobile Network (PLMN for short) and an unique Cell Identity (CID for short) in the PLMN, or three parts: the PLMN, a Routing Area Identity (RAI for short) and a Location Area Identity (LAI for short), or four parts: the PLMN, the RAI, the LAI, and the CID.

In order to be able to configure a neighbor relation of a cell timely, a Long Term Evolution (LTE for short) system proposes an Automatic Neighbor Relation (ANR for short) function to add a neighbor cell list. The ANR function is that the physical layer information of the new cell is measured with the help of the UE and is reported to the network side, and a specific cell high-layer information can be acquired from the UE, the function of adding a neighbor cell list is completed at the network side, and the neighbor cells do not need to be manually added and are automatically completed by the system.

However, there is no corresponding scheme for the problem of missing configuration of inter-system neighbor cells in the prior art.

SUMMARY OF THE INVENTION

The technical problem to be solved by the present invention is to provide a method and system for managing neighbor cell information, so as to solve the problem of missing configuration of inter-system neighbor cells.

In order to solve the above technical problem, the present invention provides a method for managing neighbor cell information, comprising:

a user equipment being reselected from a fowler resident cell belonging to other system to a current Universal Terrestrial Radio Access (UTRA) cell, and finding out that the former resident cell is not in a neighbor cell list of the current UTRA cell and the user equipment itself supports a neighbor cell relation maintenance function, and/or after receiving an indication notified by a network side that the user equipment can report a neighbor cell relation, the user equipment reporting an air interface signaling message carrying cell information of the former resident cell to a Radio Network Controller (RNC); and the RNC receiving and decoding the air interface signaling message, acquiring the cell information of the former resident cell, and updating inter-system neighbor cell information according to the cell information of the former resident cell.

Preferably, in the above method, the step of the RNC updating inter-system neighbor cell information according to the cell information of the former resident cell comprises:

the RNC adding the cell information of the former resident cell to the neighbor cell list of the current UTRA cell, or sending the cell information of the former resident cell to a self-organizing network or a network manager, and the self-organizing network or the network manager updating the inter-system neighbor cell information.

Preferably, in the above method, the indication is notified to the user equipment by the network side adding an indication cell in a downlink signaling message.

Preferably, in the above method, the air interface signaling message comprises an uplink message.

Preferably, in the above method, the uplink message comprises a cell update message or a radio resource control connection request message.

Preferably, in the above method, said other system comprises a second generation mobile communication system, a third generation mobile communication system or a fourth generation mobile communication system.

Preferably, in the above method, the cell information of the former resident cell comprises high-layer cell information and/or the physical layer cell parameters of the former resident cell.

Preferably, in the above method, when said other system is a Global System for Mobile communication (GSM) system in the second generation mobile communication system, the high-layer cell information comprises Cell Global Information (CGI) and Routing Area Code (RAC) of a former resident GSM cell; and the physical layer cell parameters comprise a Broadcast Channel Absolute Radio Frequency Channel Number (BCCH ARFCN) and/or Base Station Indication Code (BSIC) of the former resident GSM cell;

when said other system is a Code Division Multiple Access (CDMA) system in the third generation mobile communication system, the high-layer cell information comprises Cell Global Information (CGI) of a former resident CDMA cell; and the physical layer cell parameters comprise a Pseudo-Noise (PN) offset of the former resident CDMA cell; and when said other system is an Evolved Universal Terrestrial Radio Access (E-UTRA) system in the fourth generation mobile communication system, the high-layer cell information comprises a Cell Global Information (CGI), a Tracking Area Code (TAC) and a Public Land Mobile Network list (PLMNlist) of a former resident E-UTRA cell; and the physical layer cell parameters comprise a Physical Layer Cell Identity (PCI) of the former resident E-UTRA cell.

In order to solve the above technical problem, the present invention further provides a system for managing neighbor cell information, comprising a user equipment and a Radio Network Controller (RNC), wherein, the user equipment is configured to be reselected from a former resident cell belonging to other system to a UTRA cell, and find out that the former resident cell is not in a neighbor cell list of the current UTRA cell and the user equipment itself supports a neighbor cell relation maintenance function, and/or send an air interface signaling message carrying cell information of the former resident cell to the RNC after receiving an indication notified by a network side that the user equipment can report a neighbor cell relation; and the RNC is configured to receive and decode the air interface signaling message, acquire cell information of the former resident cell, and update inter-system neighbor cell information according to the cell information of the former resident cell.

Preferably, in the above system, the RNC is further configured to add the cell information of the former resident cell to the neighbor cell list of the current UTRA cell, or send the cell information of the former resident cell to a self-organizing network or a network manager, which updates the inter-system neighbor cell information.

Preferably, in the above system, the indication is notified to the user equipment by the network side adding an indication cell in a downlink signaling message.

Preferably, in the above system, the air interface signaling message comprises an uplink message.

Preferably, in the above system, the uplink message comprises a cell update message or a radio resource control connection request message.

Preferably, in the above system, said other system comprises a second generation mobile communication system, a third generation mobile communication system or a fourth generation mobile communication system.

Preferably, in the above system, the cell information of the former resident cell comprises high-layer cell information and/or physical layer cell parameters of the former resident cell.

Preferably, in the above system, when said other system is a Global System for Mobile communication (GSM) system in the second generation mobile communication system, the high-layer cell information comprises Cell Global Information (CGI) and Routing Area Code (RAC) of a former resident GSM cell; and the physical layer cell parameters comprise a Broadcast Channel Absolute Radio Frequency Channel Number (BCCH ARFCN) and/or Base Station Indication Code (BSIC) of the former resident GSM cell;

when said other system is a Code Division Multiple Access (CDMA) system in the third generation mobile communication system, the high-layer cell information comprises Cell Global Information (CGI) of a former resident CDMA cell; and the physical layer cell parameters comprise a Pseudo-Noise (PN) offset of the former resident CDMA cell; and when said other system is an Evolved Universal Terrestrial Radio Access (E-UTRA) system in the fourth generation mobile communication system, the high-layer cell information comprises a Cell Global Information (CGI), a Tracking Area Code (TAC) and a Public Land Mobile Network list (PLMNlist) of a former resident E-UTRA cell; and the physical layer cell parameters comprise a Physical Layer Cell Identity (PCI) of the former resident E-UTRA cell.

Compared with the prior art, the embodiments of the present invention provide a method and system for managing inter-system neighbor cell information to improve the capability of the network side acquiring the high-layer information of the neighbor cells of the user equipment, and further improve the capability of the system anti-dropping a call and the capability of the system maintaining call continuity of the device.

PREFERRED EMBODIMENTS OF THE PRESENT INVENTION

The implementation of the present invention will be described in detail in combination with accompanying drawings and embodiments hereinafter, thereby taking full understanding the implementation process about how to use technical means to solve the technical problem in the present invention and to achieve a technical effect, and performing the implementation process accordingly.

First, in the case of no conflict, the embodiments of the present invention as well as various features in the embodiments can be combined with each other and should be within the protection scope of the present invention. In addition, the steps shown in the flow chart of the accompanying drawings can be executed in such as a computer system comprising a set of computer executable instructions; moreover, although the logical order is shown in the flow chart, in some cases, an order different from that here can be used to execute the shown or described steps.

In the technical scheme of the present invention, the UE finds out that a former resident cell that previously resides in other system is not in a neighbor cell list of a current resident cell, and reports high-layer cell information and/or physical layer cell parameters of the former resident cell to a radio network side via an air interface signaling message, thus the missing cell relation can be identified.

Embodiment One: A Method for Managing Neighbor Cell Information

Figure 1:
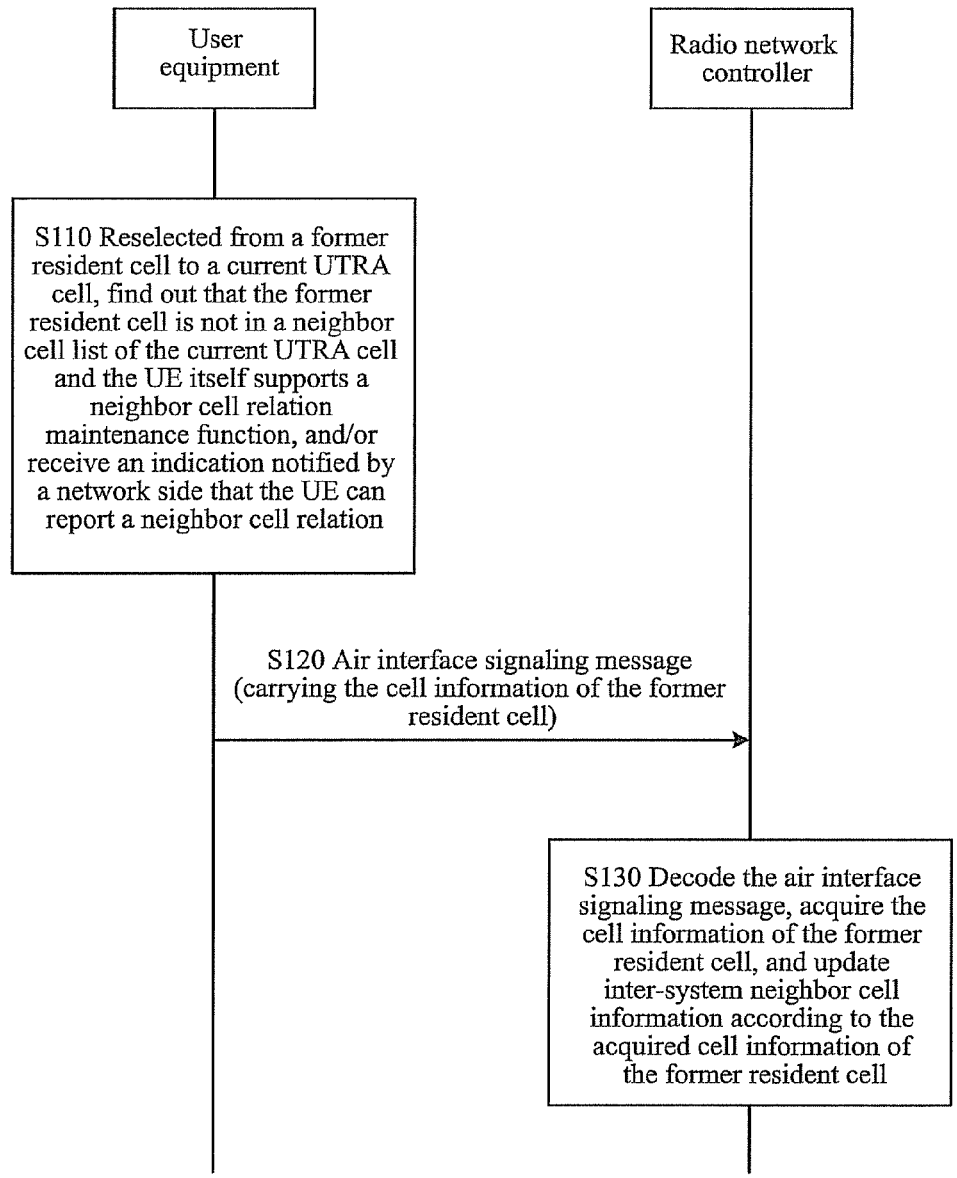
FIG. 1 is a flow diagram of a method for managing neighbor cell information described in embodiment one of the present invention.

As shown in FIG. 1, the embodiment mainly comprises the following steps:

In step S110, the UE is reselected from a former resident cell belonging to other system to a current Universal Terrestrial Radio Access (UTRA) cell, and finds out that the former resident cell is not in a neighbor cell list of the current UTRA cell and the UE itself supports a neighbor cell relation maintenance function, and/or receives an indication notified by a network side that the UE can report a neighbor cell relation;

wherein, the aforementioned other system comprises a second generation (2G) mobile communication system or a third-generation (3G) mobile communication system, wherein, the 2G system comprises for example a Global System for Mobile communication (GSM) system, and the 3G system comprises for example an Evolved Universal Terrestrial Radio Access (E-UTRA) system or a Code Division Multiple Access (CDMA) system; and wherein, the indication notified by the network side can be notified to the UE by the network side adding an indication cell in a downlink signaling message;

In step S120, the UE reports the air interface signaling message carrying the cell information of the former resident cell to a Radio Network Controller (RNC); wherein, the cell information comprises high-layer cell information and/or physical layer cell parameters of the former resident cell; and wherein, the air interface signaling message can be a cell update message, a radio resource control connection request message, or other uplink message.

In step S130, the RNC receives and decodes the air interface signaling message, acquires the cell information of the former resident cell, and updates inter-system neighbor cell information according to the acquired cell information of the former resident cell, adds the cell information of the former resident cell into a neighbor cell list of a current UTRA cell so that subsequently the UE can switch from the UTRA cell to a cell in said other system.

In step S130, the RNC can send the acquired cell information of the former resident cell to a self-organizing network or a network manager, and the self-organizing network or the network manager automatically updates the inter-system neighbor cell information.

Figure 2:
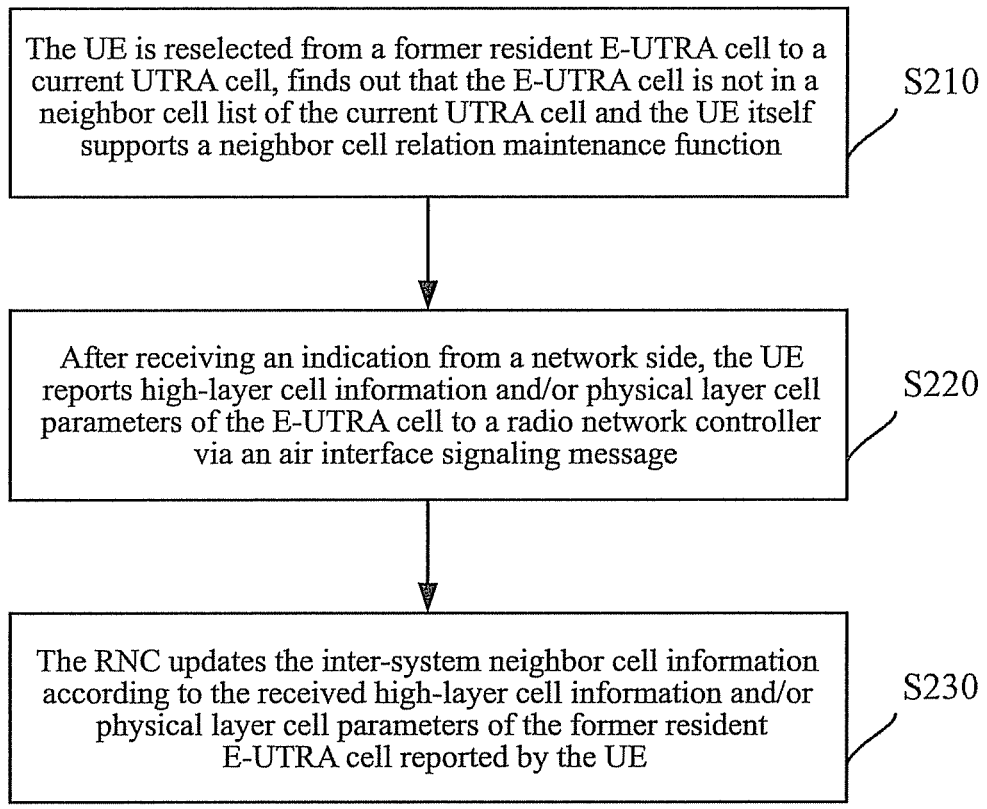
FIG. 2 is a flow diagram of one practical application in accordance with the embodiment shown in FIG. 1.

A practical application of the embodiment is that a UE is reselected from an Evolved Universal Terrestrial Radio Access (E-UTRA) cell to a UTRA cell, as shown in FIG. 2, which mainly comprises the following steps.

In step S210, the UE is reselected from a former resident E-UTRA cell to a current UTRA cell, finds out that the E-UTRA cell is not in a neighbor cell list of the current UTRA cell and the UE itself supports a neighbor cell relation maintenance function;

In step S220, after receiving an indication notified by a network side that the UE can report a neighbor relation, the UE reports high-layer cell information and/or physical layer cell parameters of the E-UTRA cell to a radio network controller via an air interface signaling message;

the indication notified by the network side can be notified to the UE by the network side adding an indication cell in a downlink signaling message;

the aforementioned air interface signaling message can be a cell update message, a radio resource control connection request message, or other uplink message;

the high-layer cell information of the E-UTRA cell reported by the aforementioned air interface signaling message comprises Cell Global Information (CGI), a Tracking Area Code (TAC) and a Public Land Mobile Network List (PLMNlist) of the former resident E-UTRA cell.

The physical layer cell parameters of the E-UTRA cell reported by the aforementioned air interface signaling message comprise a Physical Layer Cell Identity (PCI) of the former resident E-UTRA cell;

In step S230, the RNC updates inter-system neighbor cell information according to the received high-layer cell information and/or the physical layer cell parameters of the former resident E-UTRA cell reported by the UE, adds the high-layer cell information and/or the physical layer cell parameters of the former resident E-UTRA cell to the neighbor cell list of the cell; or sends the high-layer cell information and/or the physical layer cell parameters of the former resident E-UTRA cell to a self-organizing network or a network manager which automatically updates the inter-system neighbor cell information.

Figure 3:
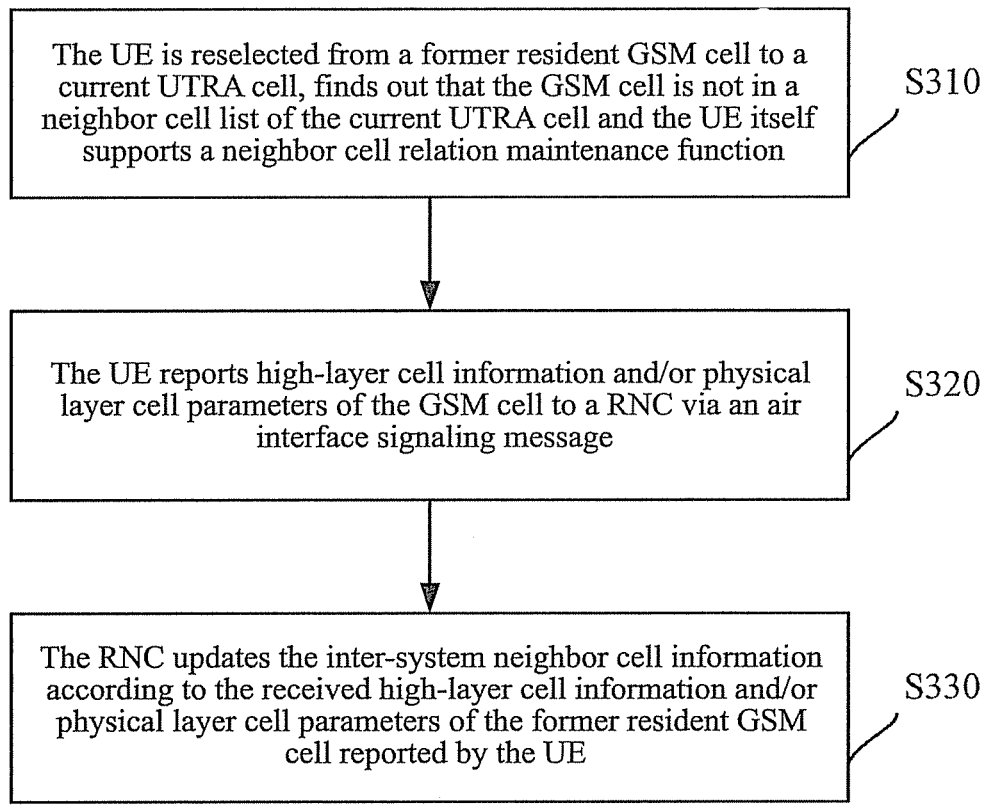
FIG. 3 is a flow diagram of another practical application in accordance with the embodiment shown in FIG. 1.

Another practical application of the embodiment is that a UE is reselected from a Global System for Mobile communication (GSM) cell to an UTRA cell, as shown in FIG. 3, which mainly comprises the following steps.

In step S310, the UE is reselected from a former resident GSM cell to a current UTRA cell, finds out that the GSM cell is not in a neighbor cell list of the current UTRA cell and the UE itself supports a neighbor cell relation maintenance function;

In step S320, the UE reports high-layer cell information and/or physical layer cell parameters of the GSM cell to a radio network controller via an air interface signaling message;

the aforementioned air interface signaling message can be a cell update message, a radio resource control connection request message, or other uplink message;

the high-layer cell information of the former resident GSM cell reported by the aforementioned air interface signaling message comprises a CGI and a Routing Area Code (RAC) of the GSM cell.

The physical layer cell parameters of the former resident GSM cell reported by the aforementioned air interface signaling message comprise Broadcast Channel Absolute Radio Frequency Channel (BCCH ARFCN) and/or a Base Station Indication Code (BSIC) of the GSM cell.

In step S330, the RNC updates the inter-system neighbor cell information according to the high-layer cell information and/or the physical layer cell parameters of the former resident GSM cell reported by the UE, and adds the high-layer cell information and/or the physical layer cell parameters of the former resident GSM cell to a neighbor cell list of the cell, or sends the high-layer cell information and/or the physical layer cell parameters of the former resident GSM cell to a self-organizing network or a network manager, which automatically updates the inter-system neighbor cell information.

Figure 4:
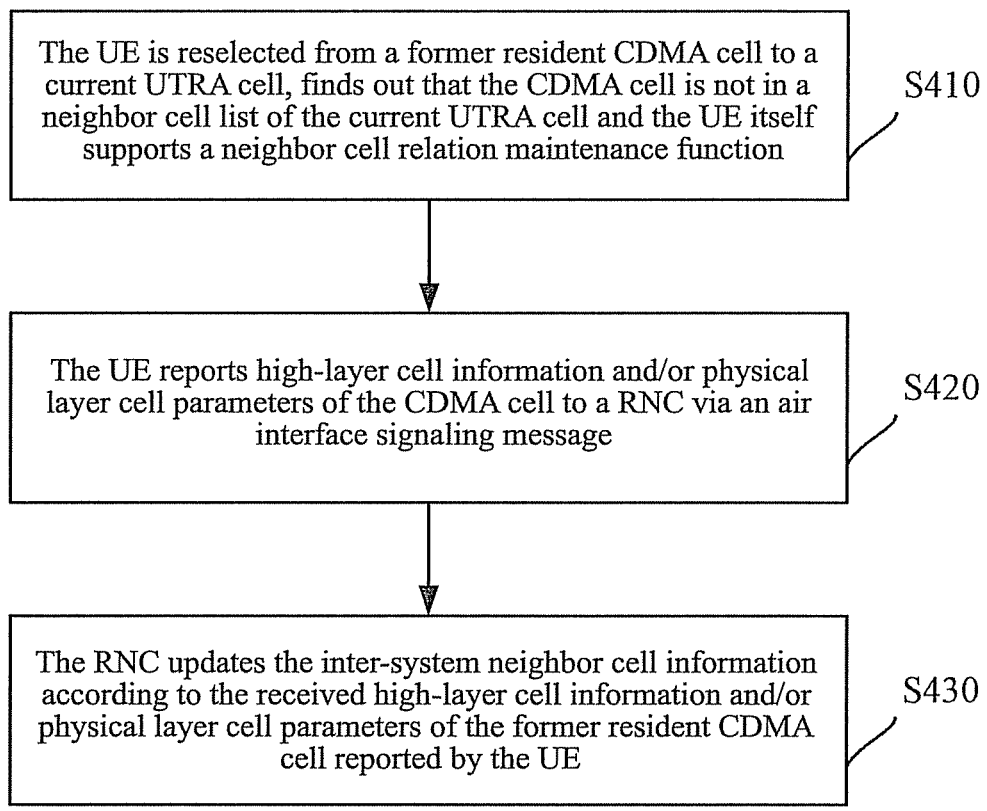
FIG. 4 is a flow diagram of a third practical application in accordance with the embodiment shown in FIG. 1.

A third practical application of the embodiment is that the UE is reselected from a Code Division Multiple Access (CDMA) cell to an UTRA cell, as shown in FIG. 4, which mainly comprises the following steps.

In step S410, the UE is reselected from a former resident CDMA cell to a current UTRA cell, finds out that the CDMA cell is not in a neighbor cell list of the current UTRA cell and the UE itself supports a neighbor cell relation maintenance function;

In step S420, the UE reports high-layer cell information and/or physical layer cell parameters of the CDMA cell to a radio network controller via an air interface signaling message;

the aforementioned air interface signaling message can be a cell update message, a radio resource control connection request message, or other uplink message;

the high-layer cell information of the former resident CDMA cell reported by the aforementioned air interface signaling message comprises a CGI of the CDMA cell;

The physical layer cell parameters of the former resident CDMA cell reported by the aforementioned air interface signaling message comprise a Pseudo-Noise Offset (PN offset) of the CDMA cell;

In step S430, the RNC updates the inter-system neighbor cell information according to the received high-layer cell information and/or physical layer cell parameters of the former resident CDMA cell reported by the UE, and adds the high-layer cell information and/or the physical layer cell parameters of the former resident CDMA cell to the neighbor cell list of the cell; or sends the high-layer cell information and/or the physical layer cell parameters of the former resident CDMA cell to a self-organizing network or a network manager, which automatically updates the inter-system neighbor cell information.

Figure 5:
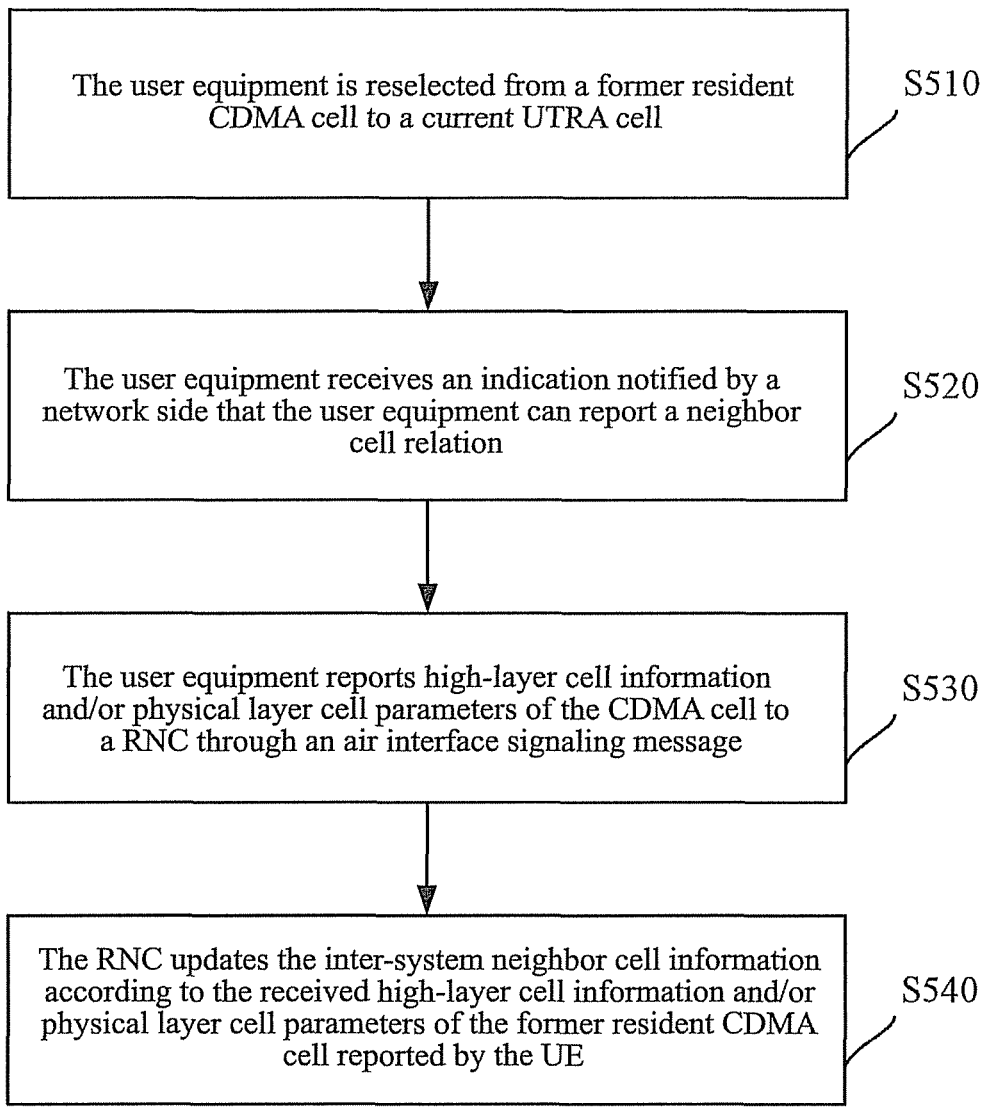
FIG. 5 is a flow diagram of a fourth practical application in accordance with the embodiment shown in FIG. 1.

A fourth practical application of the embodiment is that the UE is reselected from a Code Division Multiple Access (CDMA) cell to an UTRA cell after receiving an indication notified by a network side that the UE can report a neighbor cell relation, as shown in FIG. 5, which mainly comprises the following steps.

In step S510, the UE is reselected from the former resident CDMA cell to the current UTRA cell;

In step S520, the UE receives the indication notified by the network side that the UE can report the neighbor cell relation;

the indication notified by the aforementioned network side can be notified to the UE by the network side adding an indication cell in a downlink signaling message;

In step S530, the UE reports high-layer cell information and/or physical layer cell parameters of the CDMA cell to a radio network controller through an air interface signaling message;

the aforementioned air interface signaling message can be a cell update message, a radio resource control connection request message, or other uplink message;

the high-layer cell information of the former resident CDMA cell reported by the aforementioned air interface signaling message comprises a CGI of the CDMA cell;

the physical layer cell parameters of the former resident CDMA cell reported by the aforementioned air interface signaling message comprise a PN offset of the CDMA cell;

In step S540, the RNC updates the inter-system neighbor cell information according to the high-layer cell information and/or the physical layer cell parameters of the former resident CDMA cell reported by the UE, and adds the high-layer cell information and/or the physical layer cell parameters of the former resident CDMA cell to the neighbor cell list of the cell; or sends the high-layer cell information and/or the physical cal layer cell parameters of the former resident CDMA cell to a self-organizing network or a network manager, which automatically updates the inter-system neighbor cell information.

Embodiment Two: A System for Managing Neighbor Cell Information

Figure 6:
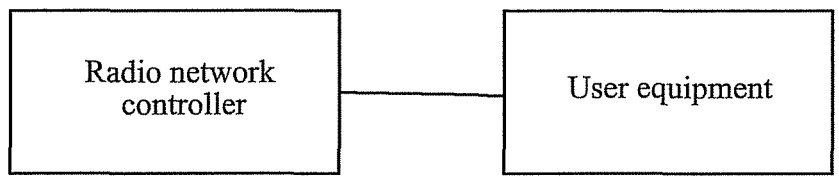
FIG. 6 is a structural diagram of a system for managing neighbor cell information described in embodiment two of the present invention.

As shown in FIG. 6, the embodiment mainly comprises a UE and a radio network controller at a network side, wherein, the UE is used to be reselected from a former resident cell belonging to other system to a current UTRA cell, find out that the former resident cell is not in a neighbor cell list of the current UTRA cell and the UE itself support a neighbor cell relation maintenance function, send an air interface signaling message carrying cell information of the former resident cell to a RNC, wherein, the cell information of the former resident cell comprises high-layer cell information and a physical layer cell of the former resident cell;

the RNC is used to decode the air interface signaling message after receiving the air interface signaling message, acquire the cell information of the former resident cell, and update inter-system neighbor cell information according to the acquired cell information of the former resident cell, add the cell information of the former resident cell to the neighbor cell list of the cell, so that subsequently the UE can switch from the UTRA cell to an cell of other system; or send the high-layer cell information and/or physical layer cell parameters of the former resident cell to a self-organizing network or a network manager, which automatically updates the inter-system neighbor cell information.

Wherein, the aforementioned UE further sends the air interface signaling message to the RNC after receiving the indication notified by the network side that the UE can report the neighbor cell relation.

Wherein, the indication notified by the network side can be notified to the UE by the network side adding an indication cell in a downlink signaling message.

Wherein, the air interface signaling message can be a cell update message, a ratio resource control connection request message, or other uplink message.

Wherein, the aforementioned other system comprises a second-generation (2G) mobile communication system, a third generation (3G) mobile communication system or a fourth generation (4G) mobile communication system, wherein, the 2G system comprises for example a Global System for Mobile communication (GSM) system, and the 3G system comprises for example a Code Division Multiple Access (CDMA) system, and the 4G system comprises for example an Evolved Universal Terrestrial Radio Access (E-UTRA) system.

Wherein, when said other system is the E-UTRA system in the fourth generation mobile communication system, the high-layer cell information of the E-UTRA cell reported by the aforementioned air interface signaling message comprises Cell Global Information (CGI), a Tracking Area Code (TAC) and a Public Land Mobile Network list (PLMNlist) of the former resident E-UTRA cell; and the physical layer cell parameters comprise a Physical Layer Cell Identity (PCI) of the former resident E-UTRA cell;

when the aforementioned other system is the GSM system in the second-generation mobile communication system, the high-layer resident information of the former resident GSM cell reported by the aforementioned air interface signaling message comprises CGI and the a Routing Area Code (RAC) of the GSM cell; and the physical layer cell parameters comprise the Broadcast Channel Absolute Radio Frequency Channel (BCCH ARFCN) and/or a Base Station Indication Code (BSIC) of the GSM cell; and when the aforementioned other system is the CDMA system in the third generation mobile communication system, the high-layer cell information of the former resident CDMA cell reported by the aforementioned air interface signaling message comprises CGI of the CDMA cell; and the physical layer cell parameters comprise a Pseudo-Noise (PN) offset of the CDMA cell.

The above description is only the preferred embodiments of the present invention, and is not used to limit the present invention. For those skilled in the art, the present invention can have a variety of modifications and changes. Any change, equivalent replacement and improvement etc. made within the spirit and the principle of the present invention should be contained within the protection scope of the present invention.

Although the implementation of the present invention is disclosed as above, the disclosure is only to facilitate understanding the implementation of the present invention rather than limit the present invention. For those skilled in the art to which the present invention belongs, any modification and change can be made in form and detail of the implementation without departing from the spirit and scope disclosed by the present invention, and the scope of patent protection of the present invention should still be subject to the scope defined by the appended claims.

Industrial Applicability

The present invention provides a method and system for managing inter-system neighbor cell information to improve the capability of the network side acquiring the high-layer information of the neighbor cell of the UE, and further improve the system anti-dropping a call capability, and the capability of the system maintaining the device call continuity.

What is claimed is:

1. A method for managing neighbor cell information, comprising:
a user equipment being reselected from a former resident cell belonging to other system to a current Universal Terrestrial Radio Access (UTRA) cell;
when the user equipment, after being reselected from the former resident cell to the current UTRA cell, finds out that the former resident cell is not in a neighbor cell list of the current UTRA cell and the user equipment itself supports a neighbor cell relation maintenance function, the user equipment reporting an air interface signaling message carrying cell information of the former resident cell to a Radio Network Controller (RNC);
when the user equipment, after being reselected from the former resident cell to the current UTRA cell, receives an indication notified by a network side that the user equipment can report a neighbor cell relation, the user equipment reporting the air interface signaling message carrying cell information of the former resident cell to the RNC; and
the RNC receiving and decoding the air interface signaling message, acquiring the cell information of the former resident cell, and updating inter-system neighbor cell information according to the cell information of the former resident cell.

2. The method of claim 1, wherein, the step of the RNC updating inter-system neighbor cell information according to the cell information of the former resident cell comprises:
the RNC adding the cell information of the former resident cell to the neighbor cell list of the current UTRA cell, or
sending the cell information of the former resident cell to a self-organizing network or a network manager, and the self-organizing network or the network manager updating the inter-system neighbor cell information.

3. The method of claim 1, wherein,
the indication is notified to the user equipment by the network side adding an indication cell in a downlink signaling message.

4. The method of claim 1, wherein,
the air interface signaling message comprises an uplink message.

5. The method of claim 4, wherein,
the uplink message comprises a cell update message or a radio resource control connection request message.

6. The method of claim 1, wherein,
said other system comprises a second generation mobile communication system, a third generation mobile communication system or a fourth generation mobile communication system.

7. The method of claim 6, wherein,
the cell information of the former resident cell comprises high-layer cell information and/or physical layer cell parameters of the former resident cell.

8. The method of claim 7, wherein,
when said other system is a Global System for Mobile communication (GSM) system in the second generation mobile communication system, the high-layer cell information comprises Cell Global Information (CGI) and Routing Area Code (RAC) of a former resident GSM cell; and the physical layer cell parameters comprise a Broadcast Channel Absolute Radio Frequency Channel Number (BCCH ARFCN) and/or Base Station Indication Code (BSIC) of the former resident GSM cell;
when said other system is a Code Division Multiple Access (CDMA) system in the third generation mobile communication system, the high-layer cell information comprises Cell Global Information (CGI) of a former resident CDMA cell; and the physical layer cell parameters comprise a Pseudo-Noise Offset (PN offset) of the former resident CDMA cell; and
when said other system is an Evolved Universal Terrestrial Radio Access (E-UTRA) system in the fourth generation mobile communication system, the high-layer cell information comprises Cell Global Information (CGI), a Tracking Area Code (TAC) and a Public Land Mobile Network List (PLMNlist) of a former resident E-UTRA cell; and the physical layer cell parameters comprise a Physical Layer Cell Identity (PCI) of the former resident E-UTRA cell.

9. A system for managing neighbor cell information, comprising a user equipment and a Radio Network Controller (RNC), wherein,
the user equipment is configured to:
be reselected from a former resident cell belonging to other system to a current Universal Terrestrial Radio Access (UTRA) cell;
when finding out that the former resident cell is not in a neighbor cell list of the current UTRA cell and supporting a neighbor cell relation maintenance function after the user equipment is reselected from the former resident cell to the current UTRA cell, send an air interface signaling message carrying cell information of the filmier resident cell to the RNC;
when receiving an indication notified by a network side that the user equipment can report a neighbor cell relation, send an air interface signaling message carrying cell information of the former resident cell to the RNC; and
the RNC is configured to receive and decode the air interface signaling message, acquire the cell information of the former resident cell, and update inter-system neighbor cell information according to the cell information of the former resident cell.

10. The system of claim 9, wherein,
the RNC is further configured to add the cell information of the former resident cell to the neighbor cell list of the current UTRA cell, or send the cell information of the former resident cell to a self-organizing network or a network manager, which updates the inter-system neighbor cell information.

11. The system of claim 9, wherein,
the indication is notified to the user equipment by the network side adding an indication cell in a downlink signaling message.

12. The system of claim 9, wherein,
the air interface signaling message comprises an uplink message.

13. The system of claim 12, wherein,
the uplink message comprises a cell update message or a radio resource control connection request message.

14. The system of claim 9, wherein,
said other system comprises a second generation mobile communication system, a third generation mobile communication system or a fourth generation mobile communication system.

15. The system of claim 14, wherein,
the cell information of the former resident cell comprises high-layer cell information and/or physical layer cell parameters of the former resident cell.

16. The system of claim 15, wherein,
when said other system is a Global System for Mobile communication (GSM) system in the second generation mobile communication system, the high-layer cell information comprises Cell Global Information (CGI) and Routing Area Code (RAC) of a former resident GSM cell; and the physical layer cell parameters comprise a Broadcast Channel Absolute Radio Frequency Channel Number (BCCH ARFCN) and/or Base Station Indication Code (BSIC) of the former resident GSM cell;

when said other system is a Code Division Multiple Access (CDMA) system in the third generation mobile communication system, the high-layer cell information comprises Cell Global Information (CGI) of a former resident CDMA cell; and the physical layer cell parameters comprise a Pseudo-Noise offset (PN offset) of the former resident CDMA cell; and when said other system is an Evolved Universal Terrestrial Radio Access (E-UTRA) system in the fourth generation mobile communication system, the high-layer cell information comprises Cell Global Information (CGI), a Tracking Area Code (TAC) and a Public Land Mobile Network list (PLMNlist) of a former resident E-UTRA cell; and the physical layer cell parameters comprise a Physical Layer Cell Identity (PCI) of the former resident E-UTRA cell.

* * * * *

UNITED STATES PATENT AND TRADEMARK OFFICE
CERTIFICATE OF CORRECTION

PATENT NO. : 8,983,469 B2
APPLICATION NO. : 13/521388
DATED : March 17, 2015
INVENTOR(S) : He et al.

It is certified that error appears in the above-identified patent and that said Letters Patent is hereby corrected as shown below:

In the Specification:

Column 2, Line 6: delete "a fowler" insert --a former--

In the Claims:

Claim 9 - Column 10, Line 34: delete "filmier resident cell" insert --former resident cell--

Signed and Sealed this
Thirtieth Day of June, 2015

Michelle K. Lee
*Director of the United States Patent and Trademark Office*